United States Patent [19]

Danzer et al.

[11] Patent Number: 5,191,343
[45] Date of Patent: Mar. 2, 1993

[54] RADAR TARGET SIGNATURE DETECTOR

[75] Inventors: Paul M. Danzer, Norwalk; Michael J. Brienza, Easton, both of Conn.

[73] Assignee: United Technologies Corporation, Hartford, Conn.

[21] Appl. No.: 836,668

[22] Filed: Feb. 10, 1992

[51] Int. Cl.$^5$ .............................................. G01S 13/87
[52] U.S. Cl. ....................................... 342/21; 342/59; 342/193
[58] Field of Search ..................... 342/21, 59, 192, 193

[56] References Cited

U.S. PATENT DOCUMENTS

| | | | |
|---|---|---|---|
| 4,053,891 | 10/1977 | Opitz | 343/5 |
| 4,303,910 | 12/1981 | McCann | 340/572 |
| 4,603,331 | 7/1986 | Wehner | 343/5 |

FOREIGN PATENT DOCUMENTS 723008 2/1955 United Kingdom .

OTHER PUBLICATIONS

Nunnally William C. and Edwards, Rosemary N., Generation and Radiation of High Power Impulses for Wideband Radar Systems, pp. 217–228, Ultra-Wideband Radar: Proceedings of the First Los Alamos Symposium, published by CRC Press 1991.

Taylor, James D. Military Electronic Systems Evolution and Ultra-Wideband Technology, pp. 463–474, Ultra-Wideband Radar: Proceedings of the First Los Alamos Symposium, published by CRC Press 1991.

Tomljanovich, N. M., Kramer, D. R., Jr., Davis, III, C. W., and Poirier, J. L. Impulse Radar Assessment for Air Defense Surveillance, pp. 491–500, Ultra-Wideband Radar: Proceedings of the First Los Alamos Symposium, published by CRC Press 1991.

Optiz, Charles L., Metal-Detecting Radar Clutter Naturally, pp. 12 and 14, Published in Microwaves, Aug. 1976.

Skolnik, Merrill I., Introduction to Radar Systems, p. 437, Published by McGraw-Hill Book Company, 1980.

*Primary Examiner*—T. H. Tubbesing
*Attorney, Agent, or Firm*—Patrick J. O'Shea

[57] ABSTRACT

An improved radar system utilizing the principle of nonlinear contact effects for detecting and identifying a target, includes two radar transmitters (12,16) at least one of which is a baseband pulse radar transmitter. Both transmitters illuminate the same target and the signals from each transmitter are mixed in a nonlinear junction (40) of the target. Mixing the two signals provides a target return signal whose frequency spectrum contains cross product frequency components having high resolution target data due to the broad spectral content of the baseband pulse, and thus provides a system capable of detecting and identifying the illuminated target.

9 Claims, 3 Drawing Sheets

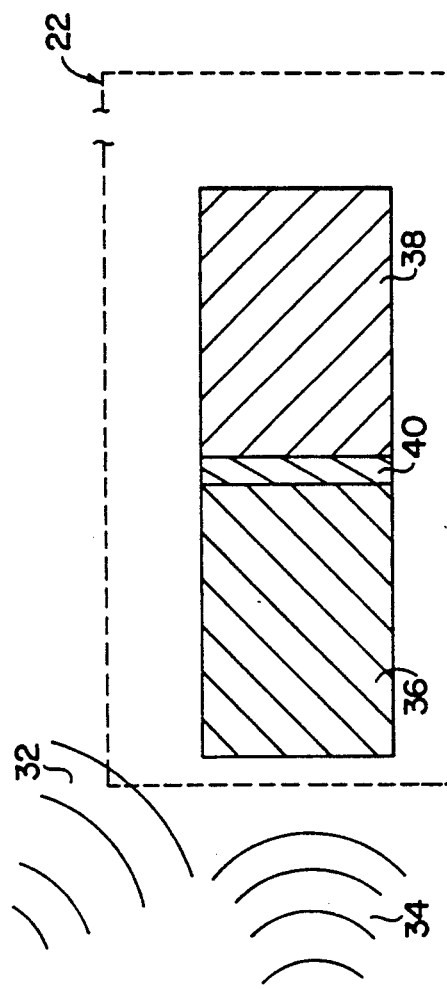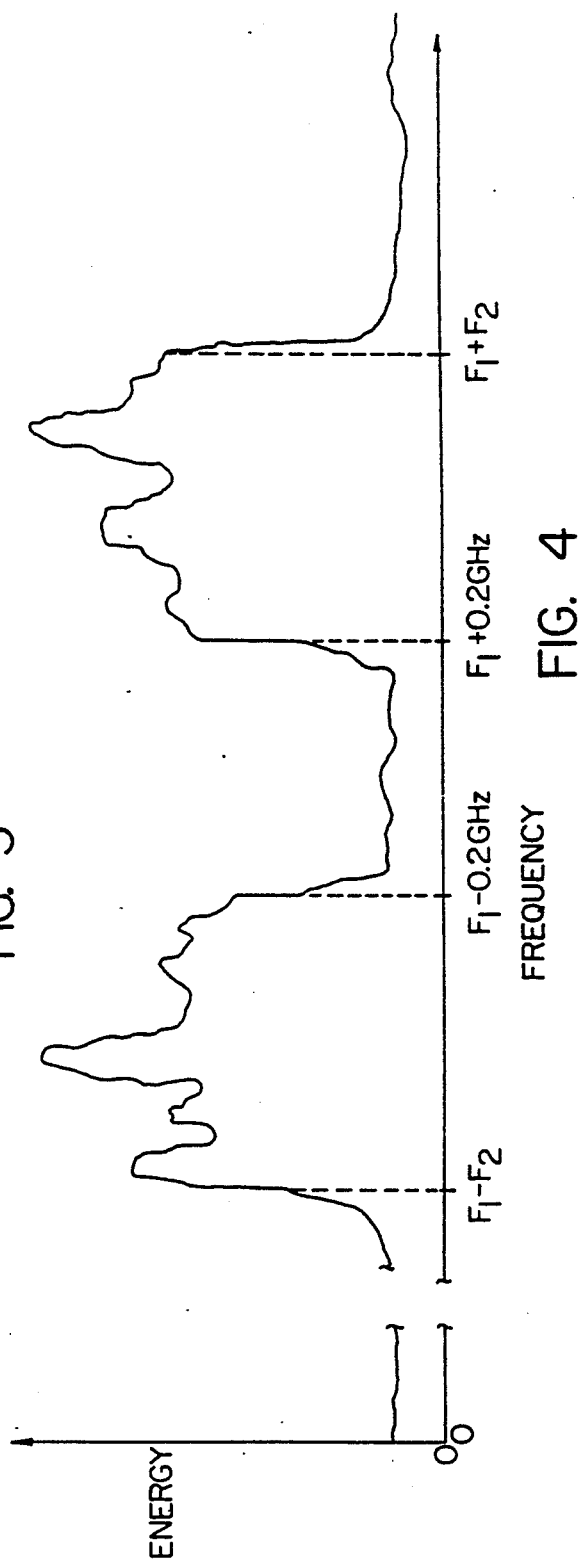

RADAR TARGET SIGNATURE DETECTOR

DESCRIPTION

1. Technical Field

This invention relates to radar, and more particularly to radar systems which utilize target nonlinear contact effects to facilitate target detection and identification.

2. Background Art

In the field of radar design there is an ever existing emphasis on increasing both the detection and identification capability of the radar. This has lead to designs utilizing narrower and narrower pulses of transmitted electromagnetic energy to break out more features (i.e., increase the resolution) associated with a target. However, narrow pulse systems are prohibitively expensive, especially baseband pulse systems.

One solution which increases the radar system's detection capability utilizes the well known principle of nonlinear contact effects. The junction between metal parts, mechanically joined, can form nonlinear (i.e., nonohmic) electrical junctions by nonmetallic materials forming between the metal parts. These non-metallic materials are usually oxides formed by corrosion. A system which utilizes this principle is often referred to as a Metal Reradiating Radar (METRRA), an example of which is disclosed in U.S. Pat. No. 4,053,891 (hereinafter '891) to Opitz.

The '891 patent discloses a METRRA system which detects metallic targets by detecting frequency components in the returned signal spectrum produced by the nonlinear characteristic of the target, while inherently suppressing natural background clutter from otherwise linear targets.

In one embodiment, the '891 patent discloses a radar system having a single conventional transmitter which receives energy from a target at a harmonic of the transmitted pulse carrier frequency. In a second embodiment the '891 patent discloses a system employing two conventional transmitters operating at carrier frequencies $f_1$ and $f_2$ respectively. The radiated energy illuminates the metal target causing the target nonlinearities (i.e., the nonlinear junctions) to serve as a mixer for the two transmitted signals, resulting in cross product frequency components in the target return signal. The radar receiver is tuned to the strongest of the cross product frequency components (e.g., $2 f_1 \pm f_2$) and the information associated with that frequency component is processed by the system for target detection.

However, one of the problems with the system disclosed in the '891 patent is that it has very limited target identification capability due to the use of relatively wide radar pulse widths. That is, the system disclosed in the '891 patent only has the ability to detect targets.

SUMMARY OF THE INVENTION

An object of the present invention is to provide a radar system for both detecting and identifying targets.

According to the present invention, an improved radar system for detecting and identifying targets includes two radar transmitters at least one of which, is a baseband pulse transmitter (i.e., an impulse radar transmitter); both transmitters illuminate the same target so the pulses from each transmitter are mixed in the nonlinear junctions of the target, such that, mixing the pulses from the two transmitters provides a target return signal whose frequency spectrum contains cross product frequency components having high resolution target data due to the broad spectral content of the narrow baseband pulse.

The present invention provides the detection and identification capability associated with a baseband pulse radar system (often referred to as an impulse radar system), while avoiding the costs associated therewith by utilizing two transmitters designed to exploit the principle of nonlinear contact effects, where at least one of the transmitters is a baseband pulse transmitter.

These and other objects, features and advantages of the present invention will become more apparent in light of the following detailed description of a best mode embodiment thereof as illustrated in the accompanying drawing.

BRIEF DESCRIPTION OF THE DRAWING

FIG. 3 illustrates a portion of the target illuminated by the improved radar target signature detector of FIG. 1; and FIG. 4 is an illustration of the energy associated with various frequency components within the frequency spectrum of the filtered return signal from the illuminated target of FIG. 3.

BEST MODE FOR CARRYING OUT THE INVENTION

Figure 1:
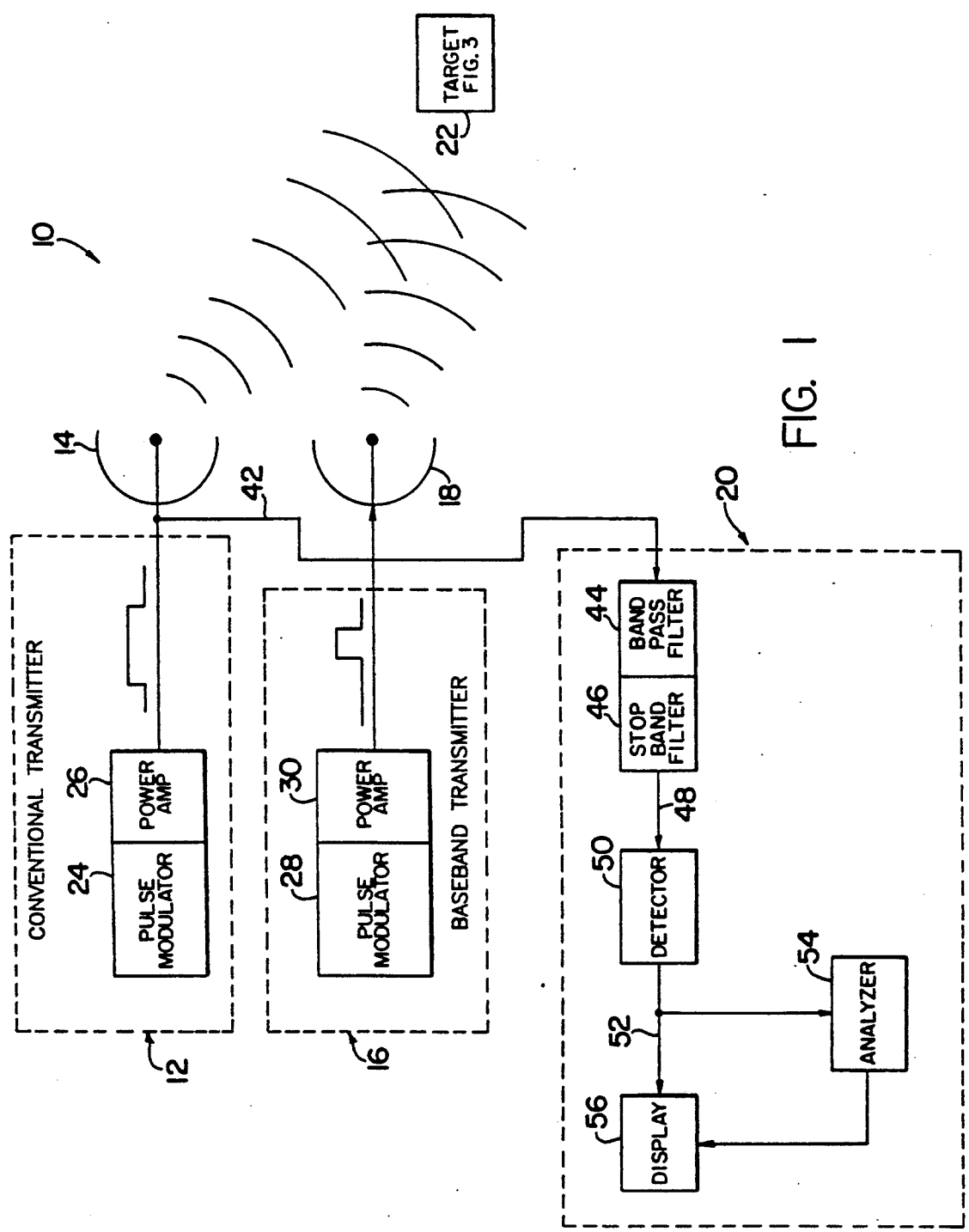
FIG. 1 is a system block diagram of an improved radar target signature detector of the present invention.

Referring to FIG. 1, an improved radar target signature detector 10 includes a conventional radar pulse transmitter 12, a first antenna 14, a baseband pulse transmitter 16, a second antenna 18 and a receiver 20. The transmitters 12, 16 illuminate a target 22 with electromagnetic energy, and a portion of the returned energy from the target is received by the receiver 20 via the first antenna 14.

The conventional pulse transmitter 12 includes a pulse modulator 24 and a power amplifier 26 which combine to provide a pulse of electromagnetic energy having a carrier frequency $f_1$, and a pulse width which is long with respect to the size of the target. The baseband pulse transmitter 16 includes a pulse modulator 28 and power amplifier 30 which generate a narrow (e.g., one nanosecond) pulse of electromagnetic energy within a baseband frequency spectrum from approximately $f_2$ to $f_3$ (e.g., 1 MHz to 1 GHz). In the conventional pulse transmitter 12, the pulse is impressed on a sinusoidal carrier signal of frequency $f_1$ and radiated; whereas in the baseband radar transmitter 16 the pulse itself having a certain spectral content is radiated.

Figure 2A:
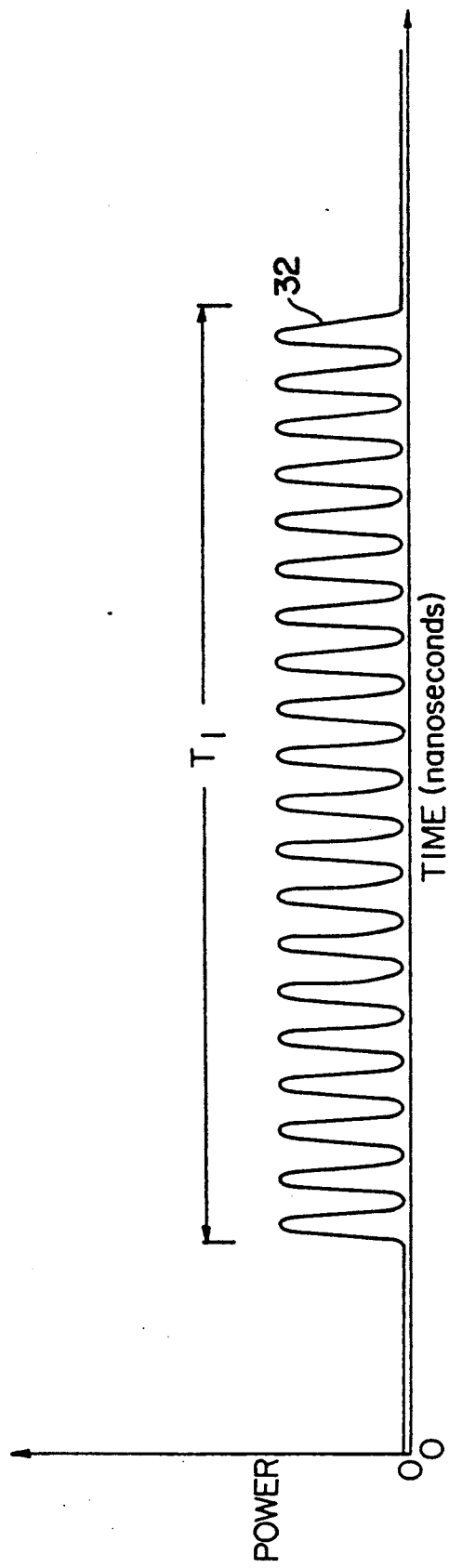
FIGS. 2A and 2B illustrate the pulses of radiated energy from each of the transmitters in the improved radar target signature detector of FIG. 1.
Figure 2B:
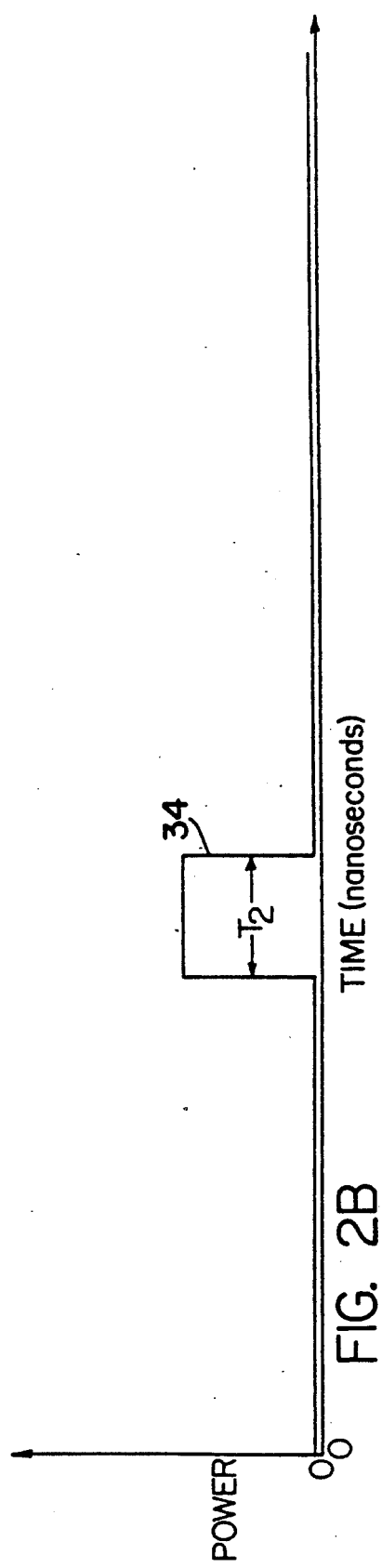

FIG. 2A illustrates a waveform 32 indicative of the pulse of electromagnetic energy generated by the conventional pulse transmitter 12, and having pulse width of period $T_1$. As an example, the pulse width $T_1$ of waveform 32 may be in the order of 10 microseconds at a carrier frequency (i.e., $f_1$) of 3.5 GHz. Similarly, FIG. 2B illustrates an ideal baseband pulse waveform 34 indicative of the electromagnetic energy generated by the baseband pulse transmitter 16, and having a pulse width of $T_2$. The pulse width $T_2$ of waveform 34 is in the order of several nanoseconds or less (e.g., one nanosecond) within the baseband of approximately 1 MHz to 1 GHz. The frequency spectrum of waveform 32 is dominated by the frequency component equal to the frequency of the sinusoidal carrier signal, whereas the frequency spectrum for the baseband pulse has considerable energy throughout its baseband spectrum (e.g., 1 MHz to 1 GHz).

The target signature detector 10 employs the principle of nonlinear contact effects to detect and identify the target. Waveforms 32, 34 from transmitters 12, 16 respectively, illuminate the target and are mixed due to the nonlinear contact effects associated with the target nonlinear junctions. The mixing creates cross product frequency components (e.g., beat frequencies) which are included in the target return signal spectrum.

Attention is drawn to the fact that the pulse width of waveform 34 is selected so that the pulse length propagated in space is less than the smallest desired identifiable characteristic of the target, and the width of waveform 32 is selected such that the propagating pulse length is longer than the length of the target. By selecting a narrow width for the baseband pulse, waveform 34, the cross product frequency components within the target return signal will contain high resolution target data which is unique to the target, and hence serves as a basis for identification of the target 22. An example of waveform mixing at the target and the resultant target return signal is now in order.

FIG. 3 illustrates a portion of the target 22 illuminated by waveforms 32, 34. The waveforms impinge on the target 22 and propagate along a first conductive metallic surface 36 and a second conductive metallic surface 38, causing electrical currents to flow in both surfaces. The waveforms, and therefore the induced currents, intercept a nonlinear junction 40 located between the metallic surfaces 36, 38 and mix within the nonlinear junction. The mixing creates cross product frequency components whose spectral content is reradiated to the receiver within the target return signal, along with some energy from the frequency spectrums of both waveforms 32, 34. In general, the more separate metallic surfaces and nonlinear junctions there are on the target, the greater the probability that significant nonlinear junctions will mix the waveforms and generate additional cross product frequency components within the spectrum of the target return signal.

Referring back to FIG. 1, the target return signal is received at the first antenna 14, and presented on a line 42 to a bandpass filter 44. The passband of the bandpass filter is selected in a frequency region from $(f_1-f_3)$ to $(f_1+f_3)$. The bandpassed signal is input to a stop band filter 46 whose stop band is centered at carrier frequency $f_1$, and has a width corresponding to the bandwidth of waveform 32 (e.g., approximately $\sim 0.2$ GHz). The result is that the stop band filter provides a filtered signal on a line 48 whose frequency spectrum contains non-attenuated frequency components from $(f_1-f_3)$ to $(f_1-0.2$ GHz$)$, and from $(f_1+0.2$ GHz$)$ to $(f_1+f_3)$.

FIG. 4 illustrates the energy associated with various frequency components within the frequency spectrum of the filtered signal on the line 42. Note: the band pass and stop band filters have significantly attenuated the frequency components outside the passbands in comparison to the frequency components within the passbands.

The filtered signal on the line 48 is input to a detector 50 which provides a processed signal on a line 52 to a signal analyzer 54 and a display 56 (e.g., a CRT). The signal analyzer 54 is used to compare the processed signal in the frequency and time domains to known signal returns in order to identify the target However, it is obvious to one of ordinary skill in the art that target identification can be performed with only the detector 50 and the display 56 since the signals on the lines 42, 48 contain high resolution data. Utilizing the analyzer 54 to supplement the raw high resolution data presented on the display is only an identification and which is made possible by the creation of the high resolution data resultant from the unique use of the baseband pulse transmitter 16 and the conventional pulse transmitter 12.

Employing a system such as the present invention reduces dependence on target size for signature information since the present invention is dependent upon the principle of nonlinear contact effects. In addition, the signature detector provides a high degree of background clutter immunity since most non man-made objects do not exhibit nonlinear contact effects.

It should be understood that the scope of this invention is not limited to the specific pulse widths, carrier frequencies, filter passbands, stop bands, and the baseband pulse frequency spectrum discussed herein. Rather these parameters can be selected within a range which is dependent on the specific characteristics of the radar and operating environment of the radar. As an example, if the present invention is used to detect both trucks and cars coupled with the ability to distinguish between the two, one set of parameters (i.e., waveforms pulse widths, baseband pulse frequency spectrum, filters passbands, etc.) may be applicable. While a second set of parameters may be required when the present invention is used as a runway surface radar designed to detect planes and vehicles on the airport surface while distinguishing between the two.

Furthermore, while the present invention has been described with respect to a preferred embodiment comprising a baseband pulse transmitter having a certain baseband spectral content, and a conventional pulse transmitter having a carrier signal signal $f_1$, one skilled in the art will appreciate that the invention is not necessarily so limited and that an alternative embodiment is the use of two baseband pulse transmitters.

All the foregoing changes and variations are irrelevant, it suffices that an improved radar system for detecting and identifying targets includes two radar transmitters at least one of which is a baseband pulse radar transmitter. Both transmitters illuminate the same target and the signals from each transmitter are mixed in the nonlinear junctions of the target. Mixing the two transmitted signals provides a target return signal whose frequency spectrum contains cross product frequency components having high resolution target data by virtue of the broad spectral content of the baseband pulse. The high resolution target data provides for both detection and identification of the illuminated target.

Although the present invention has been shown and described with respect to a best mode embodiment thereof, it should be understood by those skilled in the art that various other changes, omissions and additions to the form and detail thereof, may be made therein without departing from the spirit and scope of the invention.

We claim:

1. An improved radar target signature detector, comprising:
    a baseband radar transmitter which provides a baseband pulse of electromagnetic energy;

a baseband pulse radar antenna for radiating said baseband pulse of electromagnetic energy to illuminate the target;

a wide pulse radar transmitter which provides a wide pulse of electromagnetic energy having a certain carrier frequency;

a wide pulse radar antenna, capable of both radiating and receiving, for radiating said wide pulse of electromagnetic energy to illuminate the target, such that said wide pulse and said baseband pulse mix within one or more nonlinear junctions of the target and generate a target return signal of electromagnetic energy whose frequency spectrum contains cross product frequency components having high resolution target data created by mixing said baseband pulse and said wide pulse, and for receiving said return signal and providing a captured return signal indicative thereof; and a radar receiver which receives said captured return signal and filters said captured return signal to provide a filtered signal from which the target can be both detected and identified.

2. The improved radar target signature detector of claim 1, wherein said baseband radar transmitter comprises means for generating a pulse having a pulse width no more than several nanoseconds within a baseband of approximately one megaHertz to one gigaHertz, such that said baseband pulse signal has a frequency spectrum of about one megaHertz to one gigaHertz.

3. The improved radar target signature detector of claim 1, wherein said baseband radar transmitter comprises means for generating a pulse having a pulse width no more than four nanoseconds within a baseband of approximately one megaHertz to one gigaHertz, such that said baseband pulse signal has a pulse width no more than four nanoseconds within a baseband of approximately one megaHertz to one gigaHertz.

4. An improved radar target signature detection system, comprising:

a conventional radar transmitter that provides a relatively wide pulse of electromagnetic energy impressed on a carrier signal of a certain frequency, where the width of said wide pulse is a certain time period T;

a baseband pulse radar transmitter that provides a baseband pulse of electromagnetic energy having a pulse length which is much smaller than the dimensions of the target, wherein said baseband pulse is provided within said certain time period T such that said baseband pulse illuminates the target together with said wide pulse;

a first antenna for radiating said baseband pulse of electromagnetic energy to illuminate the target;

a second antenna for radiating said wide pulse of electromagnetic energy to illuminate the target such that said wide pulse and said baseband pulse mix within one or more nonlinear junctions of the target, generating cross product frequency components having high resolution target data within a reradiated target return signal of electromagnetic energy, and for receiving said return signal and providing a captured return signal indicative thereof;

a bandpass filter, for filtering said captured return signal, and for providing a bandpass signal indicative thereof; and a stop band filter, for filtering said bandpass signal, and for providing a filtered signal whose frequency spectrum retains said high resolution target data from which the target can be detected and identified.

5. The improved radar target signature detector system of claim 4 wherein said baseband pulse radar transmitter comprises means for generating a pulse having a pulse width less than four nanoseconds, such that the pulse width of said baseband pulse signal is less than about four nanoseconds.

6. The improved radar target signature detection system of claim 5 wherein said baseband pulse radar transmitter comprises means for generating a pulse having a frequency spectrum of approximately one megaHertz to one gigaHertz, such that said baseband pulse has a frequency spectrum of approximately one megaHertz to one gigaHertz.

7. An improved radar target signature detector for both detecting and identifying a target, comprising:

a baseband pulse radar transmitter that provides a baseband pulse of electromagnetic energy containing frequency components within a certain baseband frequency spectrum;

a radar transmitter which provides a second pulse of electromagnetic energy having a pulse width T;

an antenna for radiating said baseband pulse to illuminate the target;

means for radiating said second pulse of electromagnetic energy to illuminate the target such that said baseband pulse and said second pulse simultaneously illuminate the target, and mix within one or more nonlinear junctions of the target generating cross product frequency components having high resolution target data within a reradiated target return signal of electromagnetic energy, and for receiving said return signal and providing a captured return signal indicative thereof;

a bandpass filter, for filtering said captured return signal, and for providing a bandpass signal indicative thereof; and a stop band filter, for filtering said bandpass signal, and for providing a filtered signal whose frequency spectrum retains said high resolution target data from which the target can be detected and identified.

8. The improved radar target signature detector of claim 7 wherein said radar transmitter comprises means for generating a baseband pulse having a baseband spectrum of at least several hundred megaHertz, such that said second pulse has a baseband spectrum of at least several hundred megaHertz.

9. The improved radar target signature detector of claim 8 wherein said radar transmitter comprises means for generating a conventional radar pulse impressed on a carrier signal of a certain frequency, such that said second pulse is a conventional radar pulse on a carrier signal of said certain frequency.

* * * * *